Patented May 6, 1941

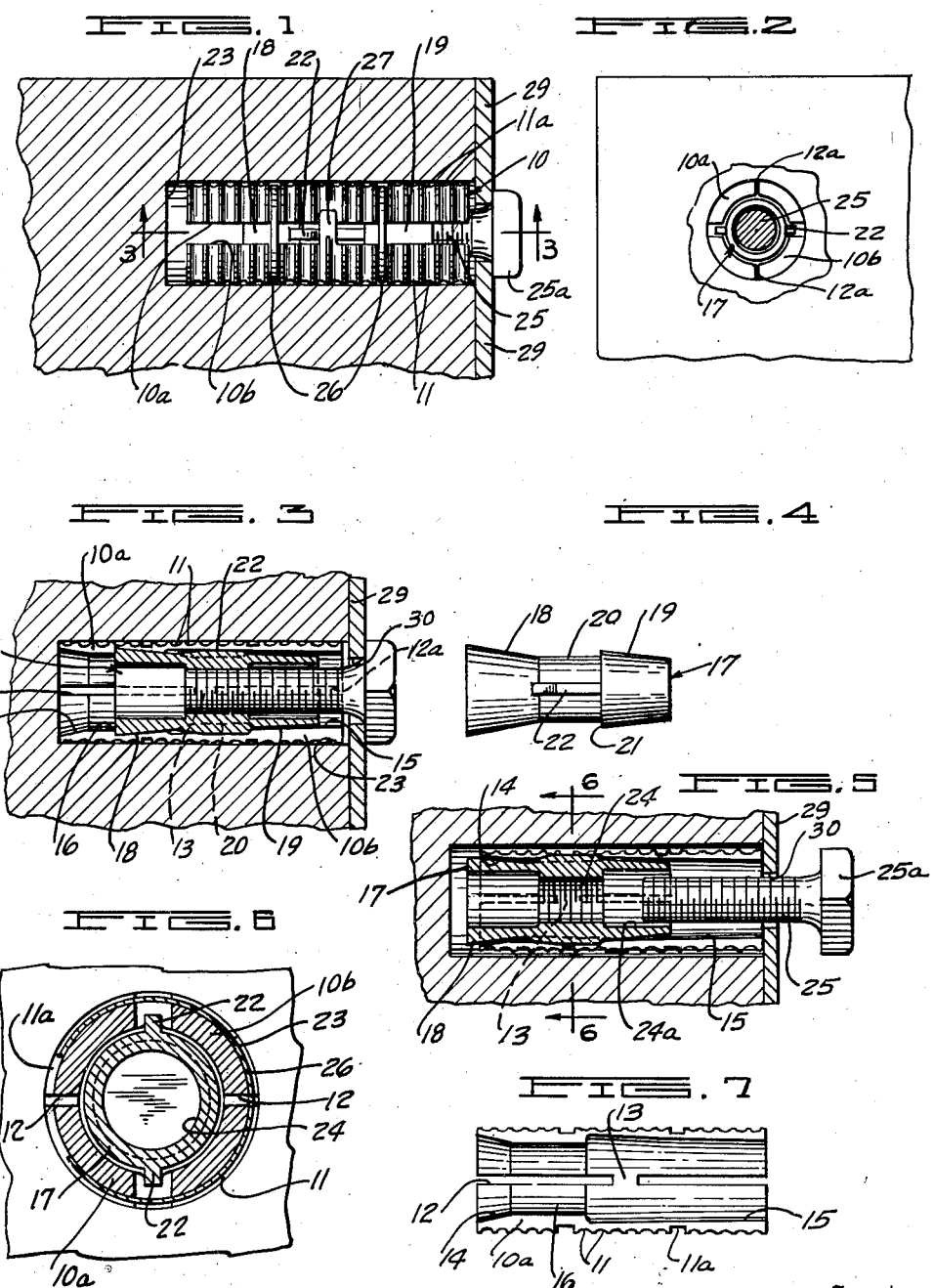

2,241,343

UNITED STATES PATENT OFFICE 2,241,343

EXPANSION SHELL FOR MACHINE BOLTS

John Fleaca, Cleveland, Ohio

Application April 4, 1940, Serial No. 327,823

2 Claims. (Cl. 85—2.4)

My invention relates to expansion shells for machine bolts or the like, the main object of which is to provide a means whereby any woodwork or iron, such as a balcony, grill work or the like, may be secured to stone or brick work, or any similar surface.

Another object is to provide a device of simple but durable construction which operates with the highest degree of efficiency.

These and other objects and advantages may be noted from the following specification and its accompanying illustrations, in which:

Fig. 1 is a side elevation of the device expanded within a wall aperture.

Fig. 2 is an end view of the device with the bolt head removed.

Fig. 3 is a sectional view of Fig. 1.

Fig. 4 is an elevation of the inner expanding wedge nut member.

Fig. 5 is a section similar to Fig. 3 but with the device not expanded.

Fig. 6 is an enlarged section on lines 6—6 of Fig. 5.

Fig. 7 is an elevation of the inner surface of one half of the outer expansible body of the device.

Again referring to the illustrations, a body 10 consists, preferably, of two parts or halves, 10a and 10b respectively, each half having a series of corrugations 11 and 11a on its outer surface.

Each half portion 10a and 10b is split or slotted at each end toward the middle as indicated at 12 and 12a; thus while the quarter sections are held together by their metal segment 13 the halves 10a and 10b become more flexible.

The inner hollow surface of the body halves 10a and 10b, are tapered at each end 14 and 15 respectively with a straight connecting surface 16 therebetween.

An elongated wedge nut 17 has an inwardly tapered outer surface 18 at one end and similarly tapered outer surface 19 at the opposite end with a straight cylindrical surface 20 therebetween ending in a shoulder 21 at the junction with the tapered end 19.

Lugs 22 on opposed sides of the straight cylindrical surface 20 serve as stops to prevent the rotation of the wedge nut 17 within the body 10 while said wedge nut is expanding.

A threaded portion 24 centrally of the inner hollow cylindrical surface of the elongated wedge nut 17 receives a bolt 25 which is guided therein by the smooth surface 24a of the outer portions of the hollow cylindrical surface.

A pair of flexible split spring binders 26 are mounted over the halves 10a and 10b of the body 10 within recesses 11a in the outer periphery of said body halves to hold the halves together.

Lapping lugs 27 project outwardly from each half portion 10a and 10b at opposed sides of said body.

In operation, the elongated wedge nut 17 is mounted within the hollow formed by the two halves 10a and 10b of the body 10, the inwardly tapered outer surface thereof being inserted rearwardly of said body, or toward the back of the aperture 23 when inserted therein.

The assembled expansion bolt being mounted within the aperture 23 the iron bracket 29 or the like is mounted in place with a bore 30 therethrough, registering with the aperture 23. The bolt 25 is inserted through the bore 30 in said iron bracket and is projected within the hollow cylindrical portion 24a of the elongated wedge nut 17 and engages the threaded portion 24.

Turning the bolt 25 within the elongated wedge nut 17 causes the said wedge nut to be drawn inwardly, the outer tapered surfaces of the wedge nut pressing outwardly against the inner tapered surfaces of the body halves 10a and 10b, causing them to expand uniformly within the flexible spring binders 26 until the corrugations 12 press into the walls of the aperture 23 and the bolt head 25a is flush against the bracket 29.

This construction prevents any loosening of the expansion bolt when the shell is expanded and prevents any possible loosening of the bracket, or the like, that is secured thereby.

I claim:

1. An expansion shell for bolts, comprising segmental shell sections each having an inner inclined surface near each end, said surfaces being inclined in the same direction but at different degrees of inclination, and a nut adapted to receive a bolt, within said sections, said nut having at each end a tubular extension the outer surfaces of which are inclined in the same direction but at different degrees of inclination and work against the inclined surfaces of the shell sections, the said segmental sections being slotted lengthwise.

2. An expansion shell for bolts, comprising segmental shell sections each having an inner inclined surface near each end, said surfaces being inclined in the same direction but at different degrees of inclination, and a nut adapted to receive a bolt, within said sections, said nut having at each end a tubular extension the outer surfaces of which are inclined in the same direction but at different degrees of inclination and work against the inclined surfaces of the shell sections, the said segmental sections being slotted lengthwise and the nut having lugs on opposite sides fitting in spaces between the adjacent edges of the sections.

JOHN FLEACA.